US006917806B2

(12) United States Patent
Chng et al.

(10) Patent No.: US 6,917,806 B2
(45) Date of Patent: Jul. 12, 2005

(54) MOBILE RADIO COMMUNICATION SYSTEM AND METHOD FOR CONTROLLING SUCH SYSTEM

(75) Inventors: Joo Hai Chng, Yokosuka (JP); Yumi Hirai, Tokyo (JP)

(73) Assignee: Telefonaktiebolaget LM Ericsson, Stockholm (SE)

( * ) Notice: Subject to any disclaimer, the term of this patent is extended or adjusted under 35 U.S.C. 154(b) by 139 days.

(21) Appl. No.: 10/344,918

(22) PCT Filed: Aug. 22, 2001

(86) PCT No.: PCT/JP01/07185

§ 371 (c)(1),
(2), (4) Date: Aug. 8, 2003

(87) PCT Pub. No.: WO02/17653

PCT Pub. Date: Feb. 28, 2002

(65) Prior Publication Data

US 2005/0032517 A1 Feb. 10, 2005

(30) Foreign Application Priority Data

Aug. 22, 2000 (JP) ........................................ 2000-251140

(51) Int. Cl.[7] ......................... H04Q 7/20; H04M 11/00; H04M 1/64
(52) U.S. Cl. ............................... 455/435.1; 455/412.1; 455/466; 379/88.12; 379/88.17; 379/88.19; 379/88.22; 379/88.25
(58) Field of Search ......................... 455/412.1, 412.2, 455/413–414, 466; 379/67.1, 88.04, 88.12, 88.17, 88.19, 88.22; 709/200–203, 226–227, 229, 238, 249

(56) References Cited

U.S. PATENT DOCUMENTS

| | | | | |
|---|---|---|---|---|
| 5,632,018 A | * | 5/1997 | Otorii | 709/200 |
| 5,892,909 A | * | 4/1999 | Grasso et al. | 709/201 |
| 5,937,162 A | * | 8/1999 | Funk et al. | 709/206 |
| 5,970,491 A | * | 10/1999 | Schreiber et al. | 707/10 |
| 6,097,949 A | | 8/2000 | Jung et al. | |
| 6,603,837 B1 | * | 8/2003 | Kesanupalli et al. | 379/88.17 |
| 6,658,454 B1 | * | 12/2003 | Delany et al. | 709/202 |
| 6,848,008 B1 | * | 1/2005 | Sevanto et al. | 709/249 |

FOREIGN PATENT DOCUMENTS

| | | |
|---|---|---|
| DE | 195 37 101 A1 | 4/1997 |
| DE | 197 43 561 A1 | 4/1999 |
| EP | 0 831 664 A2 | 3/1998 |
| EP | 0 899 918 A2 | 3/1999 |
| WO | WO 00/79826 A1 | 12/2000 |

* cited by examiner

Primary Examiner—Binh Tieu (57) ABSTRACT

A mobile radio communication system which allows stored messages to be broadcasted to any number of destinations in the mobile radio communication system which allows communication of stored messages, such as electronic mails or voice mails is provided. A broadcast group is previously registered in a second database 26, and if a mail having a destination address corresponding to the broadcast group is received, a message is broadcasted to each of members included in the corresponding broadcast group. At this time, replacing the sender's address of the broadcast message with the destination address corresponding to the broadcast group allows the reply message to the broadcast message to be handled as a broadcast message to the same members.

15 Claims, 6 Drawing Sheets

From: A <A@aaa.jp>

To: group.reg@aaa.jp  — 31

Subject: group registration

Groupname: friend — 32

A@aaa.jp
B@aaa.jp
C@aaa.jp } 33
aaa@abc.jp
bbb@efg.jp end — 34

MAIN BODY

MOBILE RADIO COMMUNICATION SYSTEM AND METHOD FOR CONTROLLING SUCH SYSTEM

TECHNICAL FIELD

The present invention relates to a mobile radio communication system. In particular, it relates to a mobile radio communication system which allows exchange of stored messages, such as electronic mails or voice mails, and a method for controlling such a system.

BACKGROUND ART

As cellular phones and personal handy-phone systems become widely available, services provided to such telephones have been expanding beyond a telephone conversation. Among these additional services other than the telephone conversation service, character communication services (message services) are ones of the most popular services, and become generally recognized as a simple communication tool.

The message services are broadly divided into two categories; short massage services for communicating relatively short character massage between telephone terminals by specifying a telephone number of a destination terminal, and Internet mail services for communicating electronic mails over the Internet or other communication networks by specifying a mail address of a recipient of the mail.

As the number of users of the message services increases, a situation in which one wants to send the same message to a plurality of destinations increasingly occurs. In order to meet such demands, one of the short message services (a message broadcast service) allows the same message to be broadcasted to a plurality of destinations by registering groups of destinations in advance, and selecting a desired group or desired destinations in a group.

However, the conventional message broadcast service does not allow an Internet mail address to be included in the broadcast destinations. In addition, if a recipient of the broadcast message simply replies to the message, the reply message is sent only to the sender of the broadcast message and is not broadcasted to the other recipients of the broadcast message.

Therefore, the recipient of the broadcast message has to also utilize the message broadcast service, or send the same message repeatedly to a plurality of destinations. Even in such a case, however, if the recipient utilizes the message broadcast service when replying, since the destinations of the reply message does not always correspond to the destinations of the original broadcast message, the reply message may be sent to an irrelevant destination, or may not be sent to the destination to which the replay message has to be sent.

Furthermore, in this kind of message service, since there is not provided means for determining with reliability to whom the received message has been broadcasted, as well as whether the received message is a broadcast message or not, it is virtually impossible to send with reliability the reply message to the received broadcast message to the sender and other recipients of the broadcast message.

DISCLOSURE OF INVENTION

The present invention is provided in view of these problems of the prior art, and it is an object of the present invention to provide a mobile radio communication system which allows stored messages to be broadcasted to any number of destinations in the mobile radio communication system which allows communication of stored messages, such as electronic mails or voice mails, and a method for controlling such a system.

It is another object of the present invention to provide a mobile radio communication system which allows a reply to the broadcast message to be broadcasted in the mobile radio communication system which allows communication of stored messages, and a method for controlling such a system.

In summary, a subject of the present invention consists in a mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said mobile radio communication system comprises: group registration means, which stores at least one destination group having a plurality of first destination information each corresponding to one of said mobile radio communication terminals or said external terminals, and a second destination information corresponding to the plurality of first destination information; destination information determining means, which compares the destination information of the stored message received from said mobile radio communication terminals or said external terminals with said second destination information to determine whether there is any destination group satisfying a predetermined condition in said destination groups or not; and broadcasting means for, in the case where there is a destination group satisfying said predetermined condition, sending said stored message to all of said mobile radio communication terminals and/or said external terminals corresponding to any of the said first destination information included in the destination group Furthermore, another subject of the present invention consists in a mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said mobile radio communication system comprises: group registration means, which stores at least one destination group having a plurality of first destination information each corresponding to one of said mobile radio communication terminals or said external terminals, and a second destination information corresponding to the plurality of first destination information; destination information determining means, which compares the destination information of the stored message received from said mobile radio communication terminals or said external terminals with said second destination information to determine whether there is any destination group satisfying a predetermined condition in said destination groups or not; and broadcasting means for, in the case where there is a destination group satisfying said predetermined condition, for all of said first destination information included in the destination group, storing said stored message in association with each of said mobile radio communication terminals if the first destination information corresponds to said mobile radio communication terminals, and sending said stored message to said corresponding external terminals if the first destination information corresponds to one of said external terminals.

Furthermore, another subject of the present invention consists in a method for controlling the mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said method comprises: a group registration step of storing at least one destination group having a plurality of first destination information each corresponding to one of said mobile radio communication terminals or said external terminals, and a second destination information corresponding to the plurality of first destination information; a destination information determining step of comparing the destination information of the stored message received from said mobile radio communication terminals or said external terminals with said second destination information to determine whether there is any destination group satisfying a predetermined condition in said destination groups or not; and a broadcasting step of, in the case where there is a destination group satisfying said predetermined condition, sending said stored message to all of said mobile radio communication terminals and/or said external terminals corresponding to any of the said first destination information included in the destination group.

Furthermore, another subject of the present invention consists in a method for controlling the mobile radio communication system, which, in addition to providing services of a telephone conversation and exchange of a stored message between a plurality of mobile radio communication terminals, can provide said exchange of the stored message between external terminals connected via a computer network and said mobile radio communication terminals, wherein said method comprises: a group registration step of storing at least one destination group having a plurality of first destination information each corresponding to one of said mobile radio communication terminals or said external terminals, and a second destination information corresponding to the plurality of first destination information; a destination information determining step of comparing the destination information of the stored message received from said mobile radio communication terminals or said external terminals with said second destination information to determine whether there is any destination group satisfying a predetermined condition in said destination groups or not; and a broadcasting step of, in the case where there is a destination group satisfying said predetermined condition, for all of said first destination information included in the destination group, storing said stored message in association with each of said mobile radio communication terminals if the first destination information corresponds to said mobile radio communication terminals, and sending said stored message to said corresponding external terminals if the first destination information corresponds to one of said external terminals.

BEST MODE FOR CARRYING OUT THE INVENTION

[First Embodiment]

The present invention will be described in detail below based on its preferred embodiments with reference to the drawings.

Figure 1:
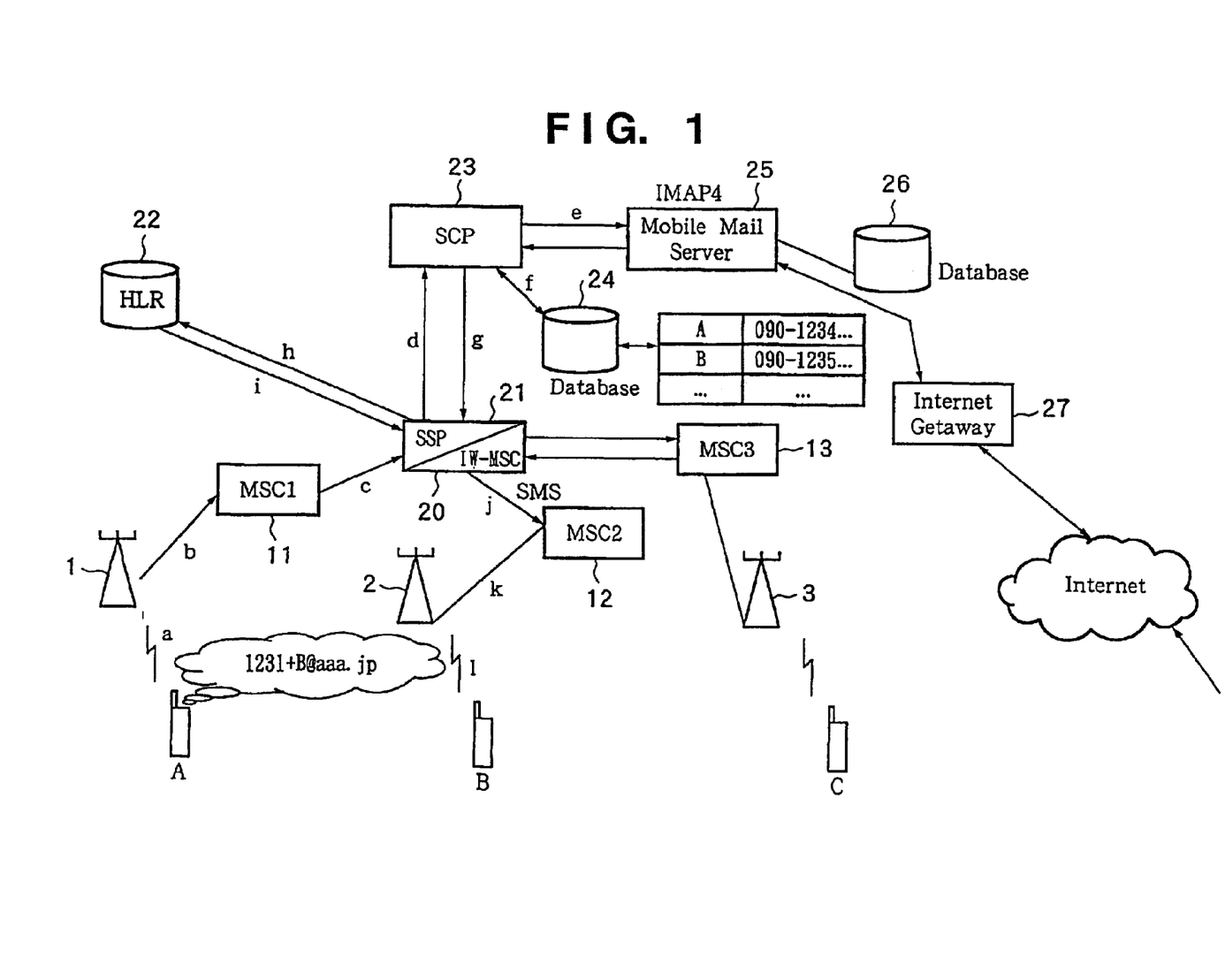
FIG. 1 is a diagram for explaining a procedure of sending a non-broadcast mail in a mobile radio communication system according to an embodiment of the present invention.

FIG. 1 is a block diagram showing an overall configuration of a communication network utilizing a mobile radio communication system according to one embodiment of the present invention.

The mobile radio communication system 10 comprises a plurality of base stations 1 to 3, mobile station controlling and switching center (MSC) 11 to 13 for establishing connection with mobile radio communication terminals, an IW-MSC 20 for sending to and receiving from an SSP described below mails from the MSCs 11–13 and mails to subscribers supported by the MSCs 11 to 13, a service controlling point (SCP) 23 for, depending on the types of the additional services (intelligent network (IN) services) such as message service to which the subscriber subscribes, providing controls corresponding to the services, a service switching point (SSP) 21 for actually performing a call processing based on the service control in the SCP 23, a message service server 25, and an Internet gateway (ING) 27 for establishing connection with the Internet.

Furthermore, a home location register (HLR) 22 for storing a telephone number, terminal information, contents of the subscribed services, and location information, etc. for each subscriber of the present system, and allowing a search using the telephone number, etc., a first database 24 for recording a correspondence between a telephone number of a subscriber of the present system and a mail account uniquely set by the subscriber, and a second database 26 for recording mails and a list of broadcast destinations used in a broadcast processing described below are provided in the mobile radio communication system 10.

In this regard, each of the IW-MSC 20, SSP 21, SCP 23, and message service server 25 can be constructed of a general purpose computer device, their respective function can be provided by a CPU executing programs stored in a storage media, such as a hard disk drive.

(Process of Sending and Receiving Non-Broadcasting Mails)

Before describing the processing of broadcasting mails, a process of sending and receiving non-broadcasting mails will be described using FIGS. 1 and 2. In the description hereinafter, "aaa.jp" will be added as a domain name to the mail addresses of the subscribers of the present system. In other words, if "aaa.jp" is included in a destination address of a mail, the mail can be determined to be the mail sent to a subscriber of the present system.

In the case where a subscriber A sends a mail to a subscriber B (having a mail address of "B@aaa.jp"), a main body of a mail is created on the subscriber terminal (mobile station) of A, the destination mail address ("B@aaa.jp") is specified, and a special number predetermined for sending mails (here, "1231") is called (a in FIG. 1). When the MSC 11 receives the call (b) via the base station 1, it detects the called number to be a mail service number, instructs the SCP 23 to activate the mail service via the SSP 21, and sends the mail to the SSP 21. The SSP 21 sends the received mail to the SCP 23 (c, d).

The SCP 23 activates its mail service in response to the instruction from the MSC 11, and transfers the mail received from the SSP 21 to the message service server 25 (e). The message service server 25 temporally stores all of the mails incoming to and outgoing from the present system in the second database 26.

And, if a system in which only registered subscribers of the mail service can utilize the mail service, when the SCP 23 activates the mail service, the mail is transferred to the message service server 25 only if the originating subscriber is authenticated as a registered subscriber of the mail service by using information specifying the originating subscriber (a subscriber number, or terminal ID, etc.) received along with the mail, and information on the subscriber of the mail service previously registered in, for example, the database 24.

And, if the originating subscriber is found not to be the registered subscriber of the mail service, the SCP 23 instructs the IW-MSC 20 to send to the subscriber A a voice message notifying the subscriber that the mail service is not available unless the subscriber subscribes to the mail service.

The SCP 23 checks the message service server 25 at intervals of a predetermined time, for example, every 10 minutes, to detect the presence of any subscriber who has received a new mail. In particular, it checks whether there is any newly added mail in the newly received mail region of the second database 26.

As described above, since all of the subscribers of the present system are allocated mail addresses having a domain name of "aaa.jp", it can be determined whether a destination of a mail is a subscriber of the present system or a subscriber of an external network connected to the system via the Internet by checking the domain name of the destination address. Therefore, when the message service server 25 stores a sent mail in the second database 26, if the mail is sent to a subscriber of the present system, the message service server can store the mail directly in the received mail region.

Since the mail sent from the subscriber A to B includes "aaa.jp" in its destination address, the SCP 23 uses the account of the destination address (the character string on the left of "@", in this case, "B") to search for the account of the subscriber of the present system registered in the first database 24 (f). As shown in FIG. 1, in the first database 24, the mail account set by the subscriber (or allocated by the administrator of the present system) and the corresponding subscriber number (telephone number) are registered. Therefore, the SCP 23 can obtain the subscriber number of the destination subscriber by searching the first database 24 for the mail account of the destination.

The SCP 23 passes the obtained subscriber number of the destination subscriber to the SSP 21, and makes the SSP check whether the destination subscriber terminal (mobile station) is in a condition in which the terminal can establish communication at that time, and which base station covers the area in which the terminal is located. The SSP 21 searches the HLR 22 for the subscriber number, checks the location and condition of the destination subscriber, and responds to the SCP 23.

In the case where the destination subscriber terminal can establish communication, the SCP 23 makes the IW-MSC 20 check whether the destination subscriber terminal can receive the mail. Although normally the subscriber terminal having its mail account set has the ability to receive mails as its terminal function, the terminal may potentially not be able to receive the mail for some reason, so that the possibility of receiving the mail is validated. The result of the validation is informed to the SCP 23.

After the IW-MSC 20 detects that the destination subscriber terminal can receive the mail, the SCP 23 instructs the IW-MSC 20 to send to the subscriber B a message notifying the subscriber of the arrival of a mail, while providing the IW-MSC with the subscriber number of the subscriber B obtained from the first database 24 (g).

Complying with the instruction, the IW-MSC 20 obtains the location information of the subscriber B from the SSP 21, and sends a predefined message notifying the subscriber of the arrival of a new mail to the subscriber B via the MSC 12 and base station 2 (j, k).

Figure 2:
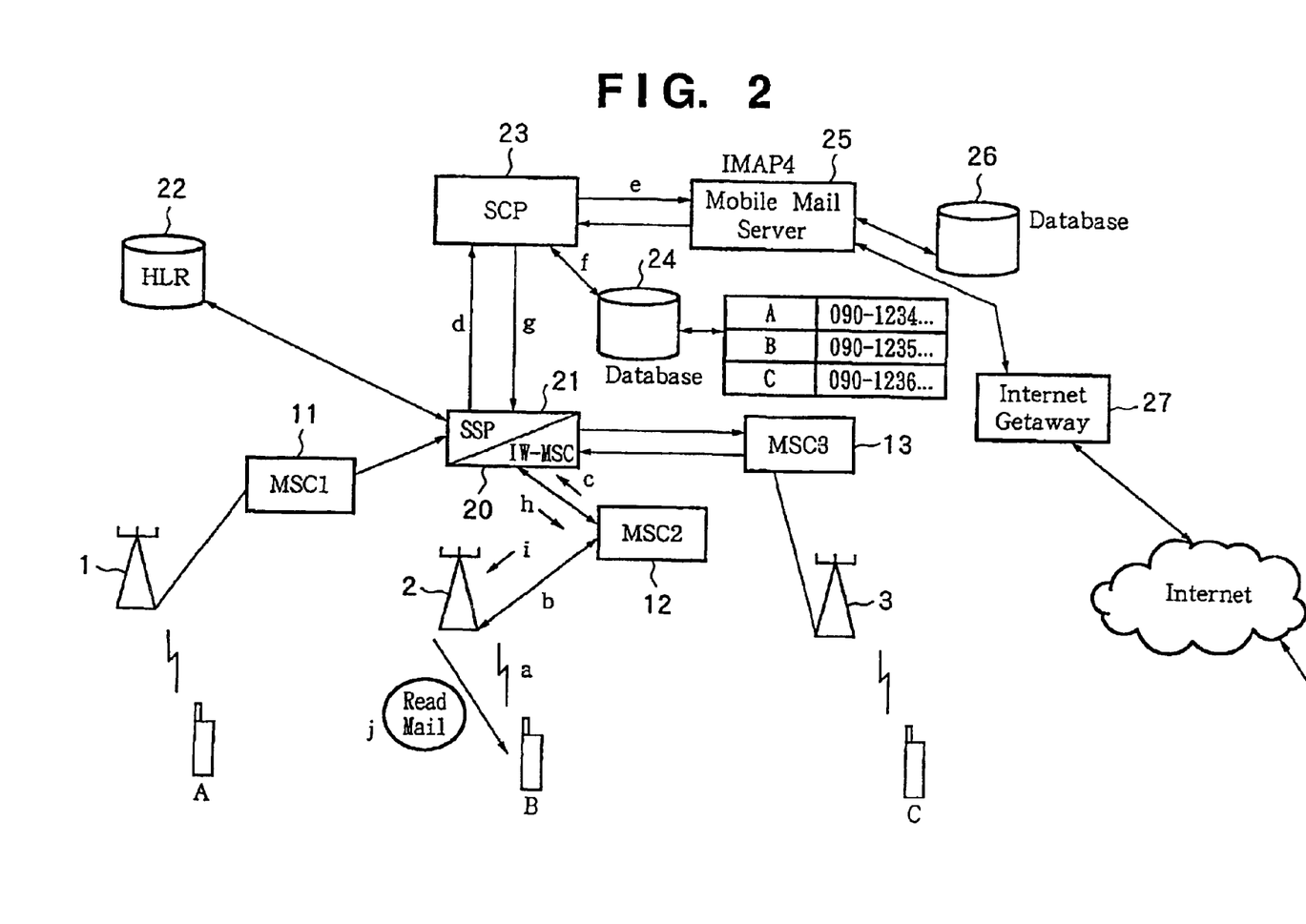
FIG. 2 is a diagram for explaining a procedure of receiving a mail in the mobile radio communication system according to an embodiment of the present invention.

Now, turning to FIG. 2, if the subscriber B having received the message notifying the arrival of a new mail wish to read in the mail, the subscriber firstly calls a number for receiving mails of "1321" (a in FIG. 2). At the time of the call, the call number as well as the subscriber number of the subscriber B, the caller, is informed.

The call number and the subscriber number of the subscriber B are informed to the MSC 12 via the base station 2 as in the case of sending mails (b), and the MSC 12 detects that the subscriber wish to utilize the mail service based on the call number. Then, the MSC instructs the SCP 23 to activate the mail service, and informs the SCP 23 of the subscriber number of the subscriber B via the SSP 21 (c, d). The SCP 23 checks whether the subscriber B is a subscriber of the present system by searching the first database 24 for the subscriber number of the subscriber B.

Then, after the subscriber B is validated as a subscriber of the present system, the SCP 23 obtains the corresponding mail account ("B"), and instructs the message service server 25 to read out the newly received mail for "B@aaa.jp" (e). the message service server 25 reads out the newly received mail for "B@aaa.jp" from the second database 26, and returns the mail to the SCP 23. Then, as in the case of sending the message notifying the subscriber B of the arrival of the new mail, after the terminal condition and location information, etc. of the subscriber B is obtained, the mail is transferred to the IW-MSC 20 along with the subscriber number if the mail sending is possible (g).

The IW-MSC 20 obtains the location information of the subscriber B from the SSP 21, and sends the mail to the subscriber B via the corresponding MSC 12 and base station (i, j).

In this way, the mail is sent and received. The mail service number may be called directly by the subscriber, or may be called automatically when an item associated with the sending and receiving of the mail is selected from the menu displayed on the subscriber terminal.

(Processing of Broadcast Mails)

1) Broadcast Group Registration Process

Next, the processing of the broadcast mails in the present system will be described. First, the registration of the group to be broadcasted will be described. In the following description, although it is assumed that the broadcast mail service is a service which is available without reservation to the subscribers of the mail service, the broadcast mail service could be a service to which subscribers of the normal mail service are required to additionally subscribe. In such a case, a process identical to that executed when checking whether the service is subscribed in the mail sending described above is executed, and only in the case where the subscription to the broadcast mail service is validated, the group registration process is executed.

Also in the mobile radio communication system according to the present embodiment, a group of members to be broadcasted has to be registered before sending a broadcast mail. Many schemes for group registration can be contemplated; representative examples of the schemes include a scheme in which the members are sequentially registered interactively through the screen of the user terminal, and a scheme in which a mail having a specific format is sent to a mail address for group registration, and the group is automatically registered by the mail server based on the contents of the mail, etc.

Since the number of the registered members is likely to be large at the time of group registration, so it is burdensome to interactively register the members on one-by-one basis, and mistakes tends to be made when the entry is made on the terminal, the mail for group registration (group registration mail) is used in the present embodiment.

Figure 3:
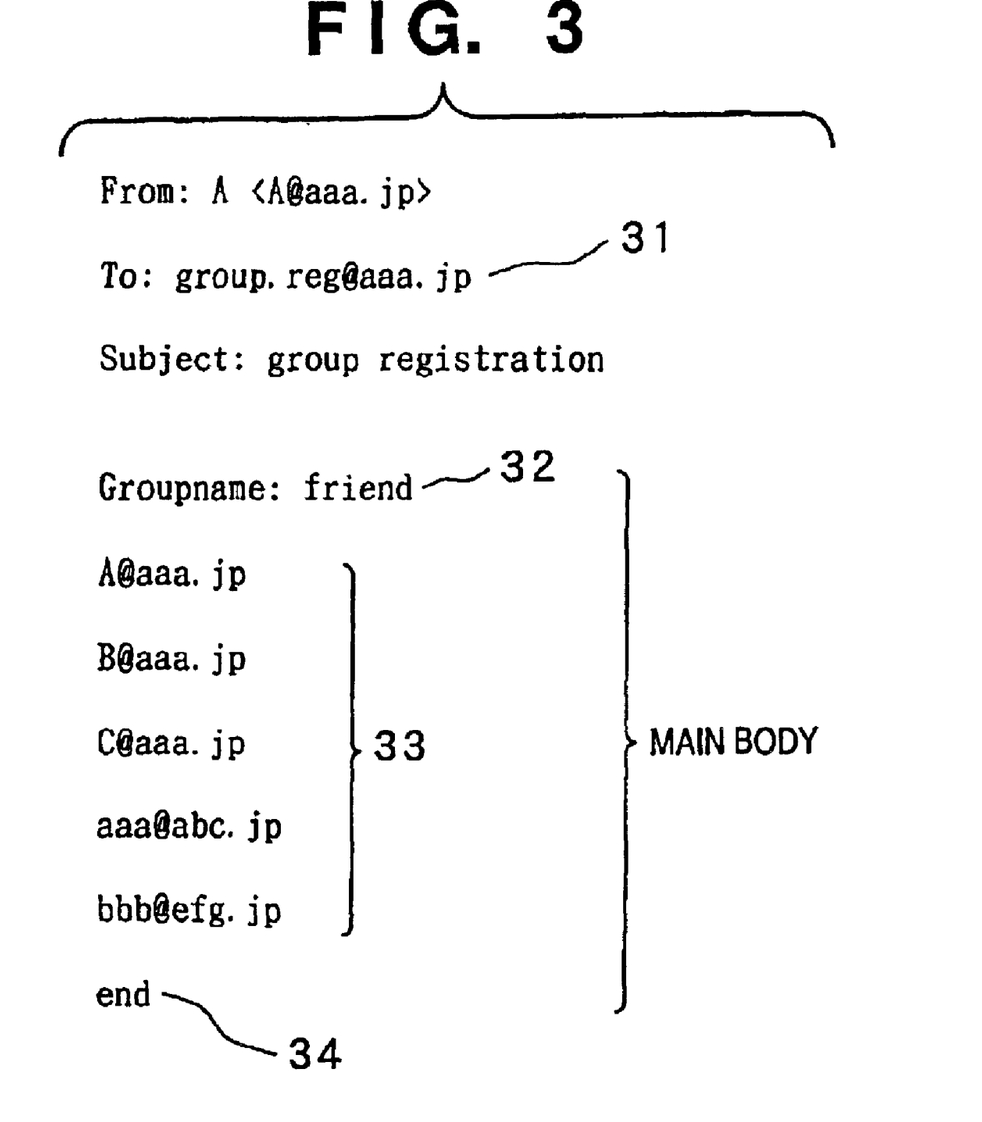
FIG. 3 shows an example of the format of the group registration mail in an embodiment of the present invention.

FIG. 3 shows an example of the format of the group registration mail in the present embodiment. The group registration mail is sent to a predefined dedicated address for group registration, and the message service server 25 analyzes the received mails whose destination address is the dedicated address for group registration and executes the registration process described below.

In the group registration mail, the destination address 31 is a predefined dedicated address for group registration (in the present embodiment, "group.reg@aaa.jp"). Although the dedicated address for group registration can be arbitrarily determined, the address needs to have a domain name handled by the message service server 25 for the message service server 25 to be able to handle the address.

In the present embodiment, since a title of the group registration mail ("subject") does not affect the group registration process, any title including a blank can be used.

On the other hand, a description of the main body of the mail has a rule: in the first line 32, a name of the registration group is specified ("friend" in FIG. 3) following the identifier "Groupname:"; then in the following lines, the mail addresses of the registered members 33 are listed one address per one line; and in the last line 34, the identifier "end" which represents a completion is posted. The address of the member may include Internet mail addresses.

The group registration mail shown in FIG. 3 is an example of a format for the system that distinguishes group registration mails based on the destination address of the mails. In the case where any other scheme is used, for example, where a dedicated call number for group registration is used, the group registration process is detected based on the call number, and the group is registered by analyzing the received mail, the destination address may be any address.

Figure 4:
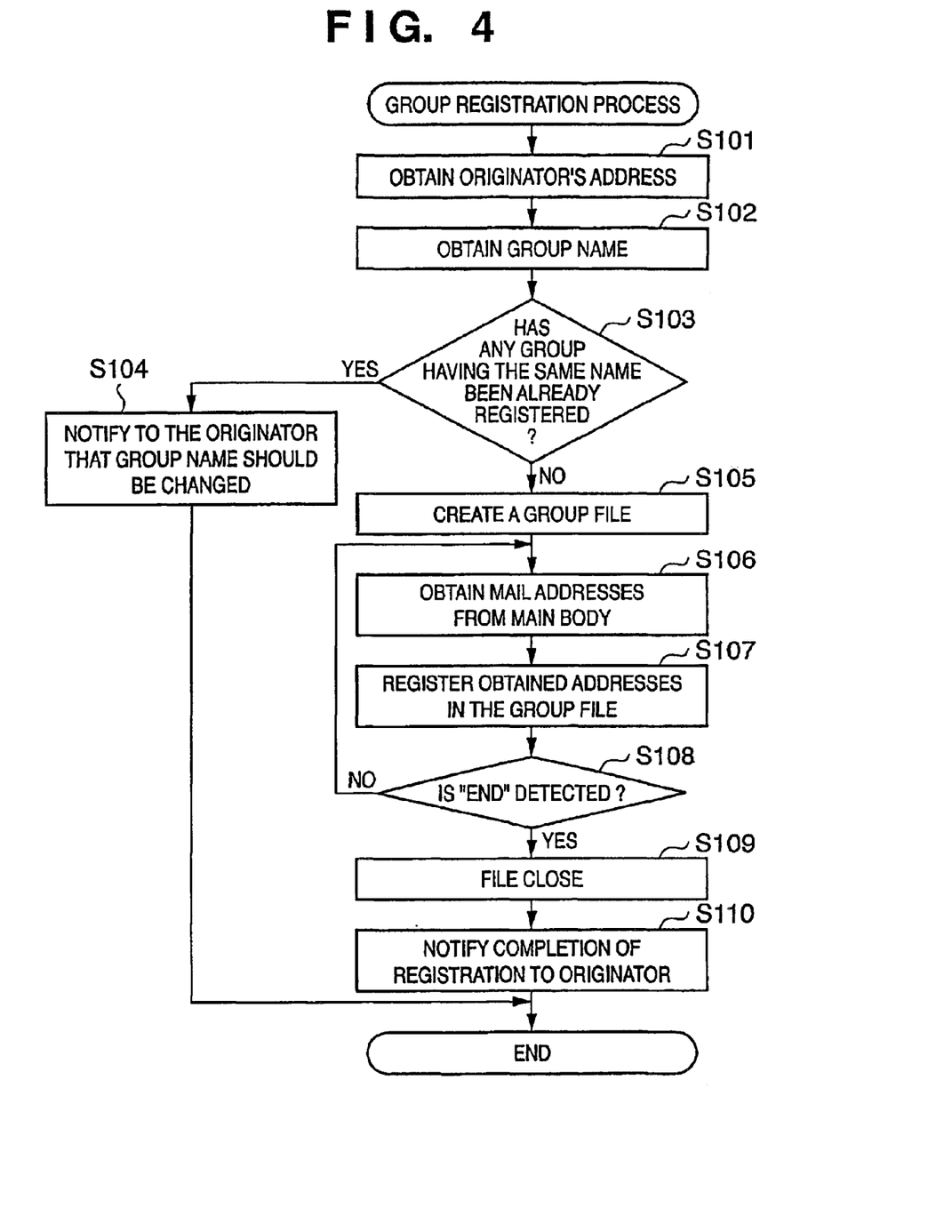
FIG. 4 is a flowchart showing the group registration process in an embodiment of the present invention.

Next, using the flowchart in FIG. 4, the processing in the message service server 25 having received the group registration mail will be described taking as an example the case where the subscriber A sends the group registration mail shown in FIG. 3. In this regard, the description about the procedure by which the group registration mail sent from the subscriber A arrives at the message service server 25 will be omitted herein because it is the same as in the normal mail described above.

In the first place, when the message service server 25 receives the mail whose destination address is the address for group registration "group.reg@aaa.jp", the server regards the mail as the group registration mail and starts the group registration process. First, the message service server obtains the originator's mail address ("A@aaa.jp"), and records the address in the database 26 as a registrant of a group (step S101). At the same time, in addition to the mail address, information specific to the terminal which cannot be changed by the subscriber, such as a terminal ID, can be recorded as information of the registrant of the group.

In this way, recording specific information which cannot be changed by the subscriber allows security against the case in which the subscriber A change his/her mail address, and an another person may use the previous mail address of the subscriber A to be enhanced. Then, the character string following the identifier "Groupname:" is obtained from the first line 32 of the main body of the mail as a group name to be registered (step S102).

Then, the message service server 25 compares the group name obtained in step S102 with the group name previously registered in the database 26 to check whether any group having the same name has not been registered in the database (step S103). If any group having the same name has already been registered, this is notified to the originator (subscriber A) in the same way as the notification of the mail receipt described above (step S104), and the group registration process is ended. In this case, the registration as the registrant of the group in step S101 is also deleted from the database 26.

On the other hand, in the case where it is determined in step S103 that any group having the same name is not registered, a file is created which has a group name obtained in step S102 (group file) (step S105). Then, one mail address of group members is obtained from the main body of the group registration mail (step S106) and registered in the group file (step S107).

In step S108, it is checked whether "end" representing the completion is detected in the line following that of the obtained mail address, and if it is not detected, the registration process returns to step S106 and continues. If "end" is detected, the group file is closed (step S109), the normal completion of the group registration is notified to the originator (subscriber A) in the same way as the notification of the mail receipt described above (step S110), and the group registration process is ended.

As in the case of the group registration, maintenance of the registered broadcast groups, such as an addition/deletion of members to/from the broadcast group, and deletion of the group, can also be attained by setting a dedicated call number for each of the functions, and sending a mail having a specific format to the number. However, these maintenance can be performed only by the registrant of the group, and it is desirable that the processing is performed only if the registrant of the group is validated by using the originator's information and the registrant's information associated with the registered group.

2) Processing of Sending Broadcast Mail

Figure 5:
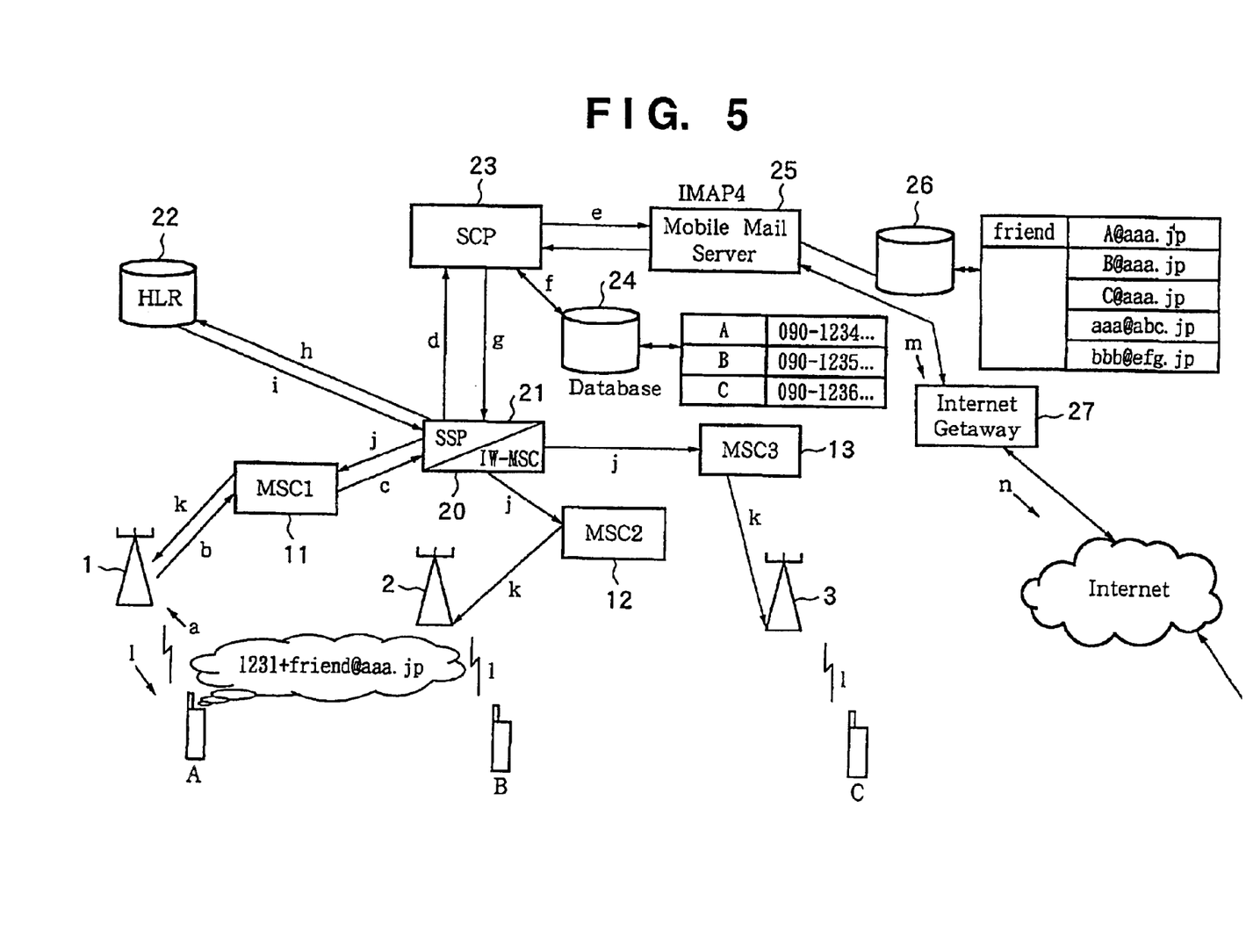
FIG. 5 is a diagram for explaining a procedure of sending a broadcast mail in the mobile radio communication system according to an embodiment of the present invention.
Figure 6:
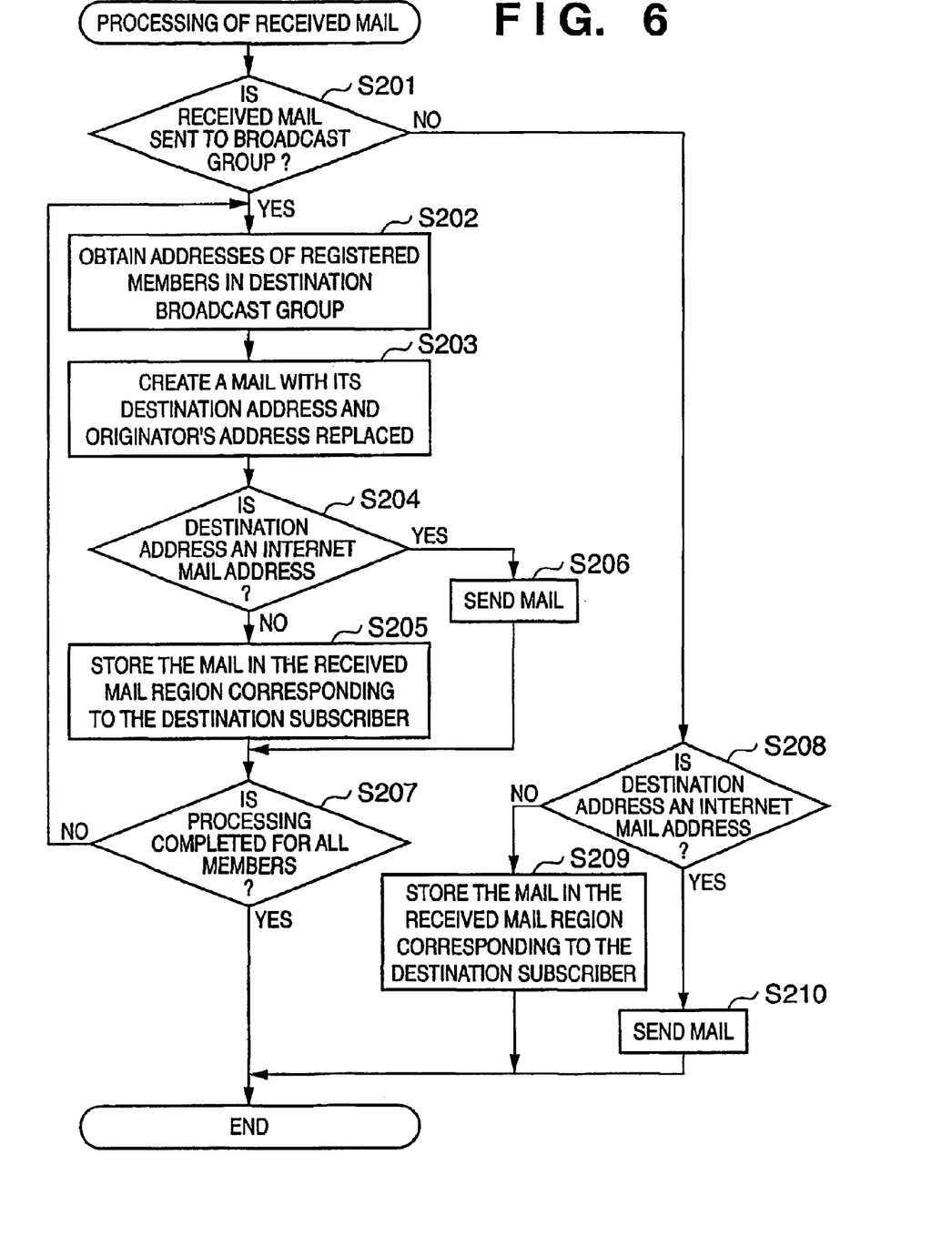
FIG. 6 is a flowchart showing the processing of the incoming mail of the message service server in the mobile radio communication system according to an embodiment of the present invention.

Next, the processing of the broadcast mails will be described using FIG. 5 and FIG. 6. FIG. 6 shows the processing of the received mail in the message service server 25. In the following description, it is assumed that the subscriber A broadcasts the mail to the members of the broadcast group "friend".

First, the subscriber, who sends the broadcast mail, creates a mail whose destination address is an address for broadcast mail. In the present embodiment, the address for broadcast mail is "friend@aaa.jp", which has the group name "friend" as an account, and has the domain name of "@aaa.jp" that can be handled by the message service server 25.

And as in the case of sending normal mails described above, the special call number for sending mails, "1231", is called, and the broadcast mail is sent (a). Subsequently, the broadcast mail is processed in the same way as in the case of sending the normal (non-broadcast) mail described above until the broadcast mail is transferred to the message service server 25.

The message service server 25 determines whether the transferred mail is a broadcast mail based on the destination address of the transferred mail "friend@aaa.jp" and the list of the broadcast group registered in the second database 26 (step S201 in FIG. 6). Since the mail is determined to be the broadcast mail in this case, the process of broadcasting the mail is performed for each of the registered members in the broadcast group "friend".

In particular, first, the addresses of the members are obtained from the broadcast group "friend" (step S202), and a broadcast mail is created whose destination address and originator's address are replaced with the obtained mail addresses of the members and the "friend@aaa.jp" for the broadcast group, respectively (step S203). Then, it is checked whether the destination address is an Internet mail address (i.e., whether its domain name is not "@aaa.jp") (step S204), and if the destination address is found to be an Internet mail address, the mail is sent to the Internet via the Internet gateway 27 (m, n, step S206).

On the other hand, a mail whose destination address is an address having a domain name "@aaa.jp" which means that the mail is sent to a subscriber of the present system is stored in the received mail region of the second database 26, which is allocated for each address (step S205). Then, it is checked whether the sending or storage in the received mail region of the mail is done for all of the members of the broadcast group (step S207), and if not completed, the process returns to step S202 and is repeated. If the processing is completed for all of the members, the processing of the received mail is ended.

By the way, if the received mail is determined not to be a broadcast mail in step S201, then the steps S208 to S210 identical to the steps S204 to S206 are performed, the mail is sent or stored in the second database 26 depending on the destination address, and the processing of the received mail.

As described above, the SCP 23 checks the message service server 25 at intervals of a predetermined time, for example, every 10 minutes, to detect the presence of any subscriber who has received a new mail. In particular, it checks whether there is any newly added mail in the mail region corresponding to each subscriber allocated to the second database 26.

Subsequently, as in the case of the arrival of the normal mail, notification with a message is performed for the subscribers having a mail newly arrived. However, since the mail sent from the subscriber A is a broadcast mail specifying the group comprising all of subscribers A, B, C as its members, the notification of the arrival of new mail is performed for all the subscribers. The notification of the arrival of new mail is not performed for the members of the broadcast members, who have Internet mail addresses ("aaa@abc.jp" and "bbb@efg.jp").

In this regard, even if the originator of the received broadcast mail has an Internet mail address, the processing of the received mail shown in FIG. 6 is performed, the mail broadcasted to the subscribers of the present system is detected by periodically checking the SCP 23, and the receipt of the new mail is notified to each subscriber who is the member of the broadcast group.

Although the system in which the dedicated number is called when the mail is sent and received, etc. has been described in the present embodiment, it is apparent that the present invention can be applied to the system in which the mail is sent and received via a packet communication.

In such a case, the mail data is sent dividedly every predetermined amount of time on the subscriber's terminal, and the base station transmits the received mail data to the packet communication network. Then, the mail data is assembled into a packet having a predetermined format in the packet switching device, and sent to the message service server. The message service server uses the packet data to perform the processing of the received mail described above. However, the mail to the subscribers of the system is also sent to each of the subscribers immediately after temporally stored in the second database 26. The mail having been sent may remain in the second database 26, or be automatically deleted after it was sent.

Furthermore, although the example in which the mail, which is the stored message of the character information, is used as an example of the stored messages has been described in the above-described embodiment, it is apparent that the present invention can be applied to the case of interchanging information other than the character information, such as a recorded sound.

As described above, according to the present invention, a mobile radio communication system can be provided, which allows a mail to be broadcasted regardless of its destination and allows an broadcast mail to be sent to the same members as the destinations of the received broadcast mail via an operation identical to that of replying to the non-broadcast mail.

What is claimed is:

1. A mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said mobile radio communication system comprises:

group registration means, which stores at least one destination group having a plurality of first destination information each corresponding to one of said mobile radio communication terminals or said external terminals, and a second destination information corresponding to the plurality of first destination information;

destination information determining means, which compares the destination information of the stored message received from said mobile radio communication terminals or said external terminals with said second destination information to determine whether there is any destination group satisfying a predetermined condition in said destination groups or not; and broadcasting means for, in the case where there is a destination group satisfying said predetermined condition, sending said stored message to all of said mobile radio communication terminals and/or said external terminals corresponding to any of the said first destination information included in the destination group.

2. The mobile radio communication system according to claim 1, wherein said destination information determining means has authentication means for determining whether said received stored message is sent from a sender previously registered or not, and said broadcasting means performs said sending process only for said stored message which is determined by said authentication means to be sent from the sender previously registered.

3. The mobile radio communication system according to claim 1, wherein said broadcasting means performs said sending by replacing sender information of said stored message with said second destination information.

4. A mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said mobile radio communication system comprises:

group registration means, which stores at least one destination group having a plurality of first destination information each corresponding to one of said mobile radio communication terminals or said external terminals, and a second destination information corresponding to the plurality of first destination information;

destination information determining means, which compares the destination information of the stored message received from said mobile radio communication terminals or said external terminals with said second destination information to determine whether there is any destination group satisfying a predetermined condition in said destination groups or not; and broadcasting means for, in the case where there is a destination group satisfying said predetermined condition, for all of said first destination information included in the destination group, storing said stored message in association with each of said mobile radio communication terminals if the first destination information corresponds to said mobile radio communication terminals, and sending said stored message to said corresponding external terminals if the first destination information corresponds to one of said external terminals.

5. The mobile radio communication system according to claim 4, wherein said mobile radio communication system comprises notification means for checking at a predetermined time interval whether there is any of said stored message stored by said broadcasting means or not, and notifying of an arrival of said stored message said mobile radio communication terminals associated with said stored message newly stored since the last check.

6. The mobile radio communication system according to claim 4, wherein said destination information determining means has authentication means for determining whether said received stored message is sent from a sender previously registered or not, and said broadcasting means performs said sending process only for said stored message which is determined by said authentication means to be sent from the sender previously registered.

7. The mobile radio communication system according to claim 4, wherein said broadcasting means performs said sending by replacing sender information of said stored message with said second destination information.

8. A method for controlling the mobile radio communication system which, in addition to providing services of a telephone conversation and exchange of a stored message between a plurality of mobile radio communication terminals, can provide said exchange of the stored message between external terminals connected via a computer network and said mobile radio communication terminals, wherein said method comprises:

a group registration step of storing at least one destination group having a plurality of first destination information each corresponding to one of said mobile radio communication terminals or said external terminals, and a second destination information corresponding to the plurality of first destination information;

a destination information determining step of comparing the destination information of the stored message received from said mobile radio communication terminals or said external terminals with said second destination information to determine whether there is any destination group satisfying a predetermined condition in said destination groups or not; and a broadcasting step of, in the case where there is a destination group satisfying said predetermined condition, sending said stored message to all of said mobile radio communication terminals and/or said external terminals corresponding to any of the said first destination information included in the destination group.

9. The method for controlling the mobile radio communication system according to claim 8, wherein said method further comprises a notification step of checking at a predetermined time interval whether there is any of said stored message stored at said broadcasting step or not, and notifying of an arrival of said stored message said mobile radio communication terminals associated with said stored message newly stored since the last check.

10. The method for controlling the mobile radio communication system according to claim 8, wherein said destination information determining step further comprises an authentication step of determining whether said received stored message is sent from a sender previously registered or not, and said broadcasting step performs said sending process only for said stored message which is determined at said authentication step to be sent from the sender previously registered.

11. The method for controlling the mobile radio communication system according to claim 6, wherein said broadcasting step performs said sending by replacing sender information of said stored message with said second destination information.

12. A method for controlling the mobile radio communication system, which, in addition to providing services of a telephone conversation and exchange of a stored message between a plurality of mobile radio communication terminals, can provide said exchange of the stored message between external terminals connected via a computer network and said mobile radio communication terminals, wherein said method comprises:

a group registration step of storing at least one destination group having a plurality of first destination information each corresponding to one of said mobile radio communication terminals or said external terminals, and a second destination information corresponding to the plurality of first destination information;

a destination information determining step of comparing the destination information of the stored message received from said mobile radio communication terminals or said external terminals with said second destination information to determine whether there is any destination group satisfying a predetermined condition in said destination groups or not; and a broadcasting step of, in the case where there is a destination group satisfying said predetermined condition, for all of said first destination information included in the destination group, storing said stored message in association with each of said mobile radio communication terminals if the first destination information corresponds to said mobile radio communication terminals, and sending said stored message to said corresponding external terminals if the first destination information corresponds to one of said external terminals.

13. The method for controlling the mobile radio communication system according to claim 12, wherein said method further comprises a notification step of checking at a predetermined time interval whether there is any of said stored message stored at said broadcasting step or not, and notifying of an arrival of said stored message said mobile radio communication terminals associated with said stored message newly stored since the last check.

14. The method for controlling the mobile radio communication system according to claim 12, wherein said destination information determining step further comprises an authentication step of determining whether said received stored message is sent from a sender previously registered or not, and said broadcasting step performs said sending process only for said stored message which is determined at said authentication step to be sent from the sender previously registered.

15. The method for controlling the mobile radio communication system according to claim 12, wherein said broadcasting step performs said sending by replacing sender information of said stored message with said second destination information.

* * * * *

UNITED STATES PATENT AND TRADEMARK OFFICE
CERTIFICATE OF CORRECTION

PATENT NO. : 6,917,806 B2  Page 1 of 1
APPLICATION NO. : 10/344918
DATED : July 12, 2005
INVENTOR(S) : Chng et al.

It is certified that error appears in the above-identified patent and that said Letters Patent is hereby corrected as shown below:

In Column 12, Line 35, in Claim 11, delete "claim 6" and insert -- claim 8 --, therefor.

Signed and Sealed this

Thirteenth Day of May, 2008

JON W. DUDAS
*Director of the United States Patent and Trademark Office*